(12) United States Patent
Burns et al.

(10) Patent No.: US 9,901,106 B2
(45) Date of Patent: Feb. 27, 2018

(54) PROCESS FOR PRODUCING FROZEN PARTICLES

(75) Inventors: Ian William Burns, Sharnbrook (GB); Andrea Williams, Sharnbrook (GB); Shiping Zhu, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 1614 days.

(21) Appl. No.: 13/009,977

(22) Filed: Jan. 20, 2011

(65) Prior Publication Data

US 2011/0183039 A1    Jul. 28, 2011

(30) Foreign Application Priority Data

Jan. 22, 2010  (EP) .................................... 10151424

(51) Int. Cl.
| | | |
|---|---|---|
| *A23G 9/48* | (2006.01) | |
| *A23G 9/46* | (2006.01) | |
| *A23G 3/34* | (2006.01) | |
| *A23G 9/24* | (2006.01) | |
| *A23G 9/28* | (2006.01) | |
| *A23G 9/44* | (2006.01) | |

(52) U.S. Cl.
CPC ........... *A23G 3/0068* (2013.01); *A23G 9/245* (2013.01); *A23G 9/28* (2013.01); *A23G 9/282* (2013.01); *A23G 9/44* (2013.01); *A23G 9/48* (2013.01)

(58) Field of Classification Search
USPC ........................................ 426/516, 565, 660
See application file for complete search history.

(56) References Cited

U.S. PATENT DOCUMENTS

| | | | |
|---|---|---|---|
| 3,623,889 A | 11/1971 | Falconer et al. | |
| 4,396,636 A | 8/1983 | Mitsuda et al. | |
| 5,120,566 A | 6/1992 | Baba et al. | |
| 5,126,156 A | 6/1992 | Jones | |
| 5,536,519 A | 7/1996 | Graf et al. | |
| 5,556,659 A * | 9/1996 | De Pedro et al. | 426/302 |
| 6,025,003 A | 2/2000 | Jadraque | |
| 6,214,394 B1 | 4/2001 | Beer | |
| 6,395,316 B1 | 5/2002 | Leas et al. | |

(Continued)

FOREIGN PATENT DOCUMENTS

| | | |
|---|---|---|
| DE | 29704924 U1 | 6/1997 |
| EP | 0201143 | 12/1986 |

(Continued)

OTHER PUBLICATIONS

Arbuckle, W.S. Ice Cream 2$^{nd}$ Edition, The AVI Publishing Group 1972, pp. 240 and 242.*

(Continued)

*Primary Examiner* — Kelly Bekker
(74) *Attorney, Agent, or Firm* — Gerard J. McGowan, Jr.

(57) ABSTRACT

A process for preparing frozen particles having an average diameter of from 1 to 10 mm and comprising from 1 to 50 wt % of a frozen aqueous core and from 50 to 99 wt % of a fat-based shell is provided, the process comprising: providing a dispensing device having an inner nozzle and an outer nozzle which surrounds the inner nozzle; supplying an aqueous mix to the inner nozzle and a fat-based mix to the outer nozzle, thereby forming particles with a water-continuous core and a fat-continuous shell, and then dropping the particles into a refrigerant.

10 Claims, 1 Drawing Sheet

(56) References Cited

U.S. PATENT DOCUMENTS

| | | |
|---|---|---|
| 6,818,238 B2 | 11/2004 | Napolitano et al. |
| 7,163,708 B2 | 1/2007 | Dalziel et al. |
| 2002/0159957 A1 | 10/2002 | Lages et al. |
| 2004/0247747 A1 | 12/2004 | Jones et al. |
| 2005/0079215 A1 | 4/2005 | Schleifenbaum et al. |
| 2005/0100640 A1 | 5/2005 | Pearce |
| 2005/0244568 A1 | 11/2005 | Gokhan |
| 2006/0110442 A1 | 5/2006 | Wonschik et al. |
| 2006/0134274 A1 | 6/2006 | Ladd et al. |
| 2007/0134394 A1 | 6/2007 | Jones |
| 2007/0281067 A1 | 12/2007 | Braithwaite et al. |
| 2008/0014312 A1 | 1/2008 | Notebaart et al. |
| 2008/0075811 A1 | 3/2008 | Horlacher et al. |
| 2008/0317824 A1 | 12/2008 | Wonschik |
| 2009/0269447 A1 | 10/2009 | Brimmer et al. |
| 2009/0277186 A1 | 11/2009 | Jones |
| 2010/0143560 A1 | 6/2010 | Burmester et al. |

FOREIGN PATENT DOCUMENTS

| | | |
|---|---|---|
| EP | 427544 | 11/1990 |
| EP | 0502697 A1 | 9/1992 |
| EP | 0923883 A2 | 6/1999 |
| EP | 0931462 A1 | 7/1999 |
| EP | 1075794 A1 | 2/2001 |
| EP | 1343341 A1 | 1/2003 |
| EP | 1529447 A1 | 5/2005 |
| EP | 1537791 A1 | 6/2005 |
| EP | 1886579 A1 | 2/2006 |
| EP | 2039253 A1 | 3/2009 |
| EP | 2163158 | 3/2010 |
| GB | 1439143 | 6/1976 |
| GB | 2075326 A | 11/1981 |
| GB | 2300105 A | 8/1995 |
| JP | 59162845 A | 9/1984 |
| JP | 4091749 A | 3/1992 |
| JP | 6098684 A | 4/1994 |
| JP | 7163301 | 6/1995 |
| JP | 7177350 A | 7/1995 |
| JP | 2004267166 | 9/2004 |
| KR | 20050093176 A | 9/2005 |
| RU | 2204908 | 5/2003 |
| WO | WO 95/18542 | 7/1995 |
| WO | WO 95/20883 | 8/1995 |
| WO | WO 96/11053 | 4/1996 |
| WO | WO 97/02343 | 1/1997 |
| WO | WO 97/04663 | 2/1997 |
| WO | WO 98/43491 | 10/1998 |
| WO | WO 00/07457 | 2/2000 |
| WO | WO 02/102167 A1 | 12/2002 |
| WO | WO 2004/016720 A2 | 2/2004 |
| WO | WO 2004/034796 A1 | 4/2004 |
| WO | WO 2004/077964 A1 | 9/2004 |
| WO | WO 2004/091305 A1 | 10/2004 |
| WO | WO 2005/077200 A1 | 8/2005 |
| WO | WO2007019882 | 2/2007 |
| WO | WO 2007/066178 A2 | 6/2007 |
| WO | WO2007087294 | 8/2007 |
| WO | WO 2008/120975 A1 | 10/2008 |
| WO | WO2008125595 | 1/2009 |
| WO | WO 2009/022909 A1 | 2/2009 |
| WO | WO 2009/023218 A1 | 2/2009 |
| WO | WO 2009/037221 A1 | 3/2009 |
| WO | WO 2009/086074 A1 | 5/2009 |

OTHER PUBLICATIONS

Talbot (ed.) Science and technology of en robed and filled chocolate, confectionery and bakery products CRC Press Jun. 26, 2009 pp. 163 and 177.*

European Search Report for Application No. 10195204.2-2313 dated May 18, 2011, pp. 1-3.

Marshall, Ice Cream, Ice Cream, 2010, 6th Ed, Kluwer Academic/Planum Publishers, ., pp. 56, 57, 66, 67 and 81-85.

Search Report in EP09180211, dated Apr. 14, 2010, EP, pp. 1-2.

Search Report in EP10151424, dated Sep. 2, 2010, EP, pp. 1-3.

Search Report in EP10195205, dated Jan. 28, 2011, EP, pp. 1-3.

European Search Report Application No. EP 10151425 dated Sep. 2, 210, pp. 1-3.

JP 1023853A, published Jan. 26, 1989, abstract ( PatBase), p. 1.

Manufacturing Confectioner, 1991, 71 (3) 64-69—abstract.

Clarke et al., "Ice Structuring Proteins—A New Name for Antifreeze Proteins", CryoLetters 23, 89-92 (2002).

Co-pending application Burns et al., U.S. Appl. No. 12/968,325, filed Dec. 15, 2010, pp. 1-16.

* cited by examiner

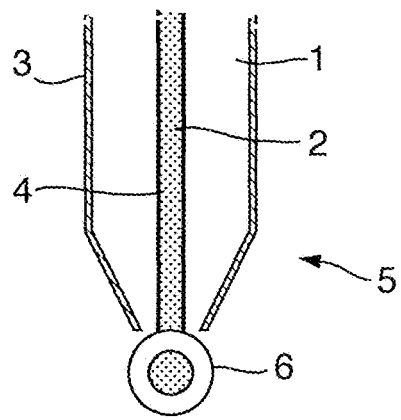
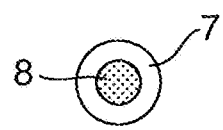
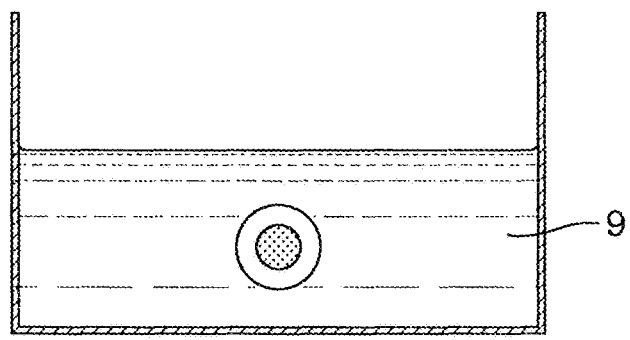

PROCESS FOR PRODUCING FROZEN PARTICLES

TECHNICAL FIELD OF THE INVENTION

The present invention relates to a process for producing discrete frozen particles.

BACKGROUND TO THE INVENTION

Frozen confections consisting of discrete particles of water ice and/or ice cream typically a few millimeters in size are popular products. For example U.S. Pat. No. 5,126,156 describes a method for preparing a free-flowing, frozen dairy product in which beads of product are prepared by dripping a mix into a freezing chamber. In order to make frozen confections more interesting and attractive to consumers, they may be coated with chocolate or similar other coating materials. Whilst it is common practice to coat stick or bar products, e.g. by dipping or enrobing, it is less straightforward to coat small particles. WO 09/023218 discloses a system for making pieces of ice cream in the form of small discs of from 5 to 25 mm in diameter by means of cryogenically cooled rollers. The pieces are coated by spraying them with a coating such as candy, syrup, chocolate or caramel. EP 923 883 discloses a method of tumble coating pieces of foods (such as vegetables, fruit, sweets and ice cream) having a size of from 1 to 200 mm. However, these processes require complex equipment for forming the small pieces and/or coating them. Therefore there is a need for an improved process for producing small pieces of coated frozen confections.

BRIEF DESCRIPTION OF THE INVENTION

We have now devised a new process for producing coated frozen particles. The particles have a core/shell structure with a shell of a fat-based coating and a frozen aqueous core. Accordingly, in a first aspect, the present invention provides a process for preparing frozen particles having an average diameter of from 1 to 10 mm and comprising from 1 to 50 wt % of a frozen aqueous core and from 50 to 99 wt % of a fat-based shell, the process comprising:
(a) providing a dispensing device having an inner nozzle and an outer nozzle which surrounds the inner nozzle;
(b) supplying a fat-based mix to the outer nozzle and an aqueous mix to the inner nozzle, thereby forming particles with a fat-continuous shell and a water-continuous core, and then
(c) dropping the particles into a refrigerant.

Preferably the aqueous mix is a water ice mix or an ice cream mix.

Preferably the fat-based mix comprises an oil selected from coconut oil, palm oil, palm kernel oil, cocoa butter, milk fat, sunflower oil, safflower oil, olive oil, linseed oil, soybean oil, rapeseed oil, groundnut oil and mixtures, fractions or hydrogenates thereof.

Preferably the core constitutes from 5 to 40 wt % of the particles, more preferably from 10 to 30 wt %, such as about 20 wt %.

In one embodiment the aqueous mix contains an ingredient which can react with another ingredient which is contained in the fat-based mix.

Preferably the particles have an average diameter of between 2 and 7 mm.

In one embodiment the fat-based mix is a chocolate or chocolate analogue. In another embodiment the fat-based mix is a water-in-oil emulsion.

In one embodiment each particle has a single core having a diameter of from 1 to 4 mm. In another embodiment, each particle has more than one core.

Products obtained and obtainable by the process of the invention are also provided.

DETAILED DESCRIPTION OF THE INVENTION

Unless defined otherwise, all technical and scientific terms used herein have the same meaning as commonly understood by one of ordinary skill in the art (e.g. in frozen food manufacture). Definitions and descriptions of various terms and techniques used in frozen confectionery manufacture are found in "Ice Cream", 6$^{th}$ Edition R. T. Marshall, H. D. Goff and R. W. Hartel, Kluwer Academic/Plenum Publishers, New York 2003.

The aqueous mix is a water-continuous liquid. Hence the aqueous core which is produced from it is also water-continuous, although of course in the solid frozen core, much of the water is in the form of ice. The aqueous mix is a solution and/or suspension of other ingredients, especially those typically used in frozen confections, such as sugars, fats, proteins, emulsifiers, stabilisers, colours, flavours etc. Thus the aqueous mix may be a water ice mix which typically comprises water and one or more of sugars, stabilisers, colours and flavours, but little or no fat or protein (e.g. less than 5 wt % of each, preferably less than 2 wt %). Alternatively, the aqueous mix (and hence the core) may be an oil-in-water emulsion, such as an ice cream mix, which contains small emulsified fat droplets (i.e. 50 μm or less in diameter, preferably smaller than 10 μm). The aqueous mix may be aerated or unaerated.

Even when the aqueous mix is not an oil-in-water emulsion, it may nonetheless contain surface active proteins, e.g. milk proteins, soy protein, egg protein, or low molecular weight emulsifiers, e.g. mono-/di-glycerides, Tweens, sucrose esters, diacetyl tartaric acid esters of monoglycerides (such as DATEM), citric acid esters of monoglycerides, polyglycerol esters (such as PGE 55, a polyglycerol ester of fatty acids, available from Danisco), stearoyl lactylates, lactic acid esters, acetic acid esters and propylene glycol esters. Preferably the emulsifier is water-soluble.

The aqueous mix may also contain a calcium salt, for example calcium sulphate, and/or a source of phosphate ions. Adding calcium and/or phosphate ions can help to counter demineralization of tooth enamel which can result from consuming acidic foods, such as water ices.

The fat-based mix and the shell produced from it are both fat-continuous. The fat may be an oil which is liquid at room temperature, or a solid fat which can be melted, so that it is in liquid form when it is pumped to the nozzle. For example the fat may be one or more of coconut oil, palm oil, palm kernel oil, cocoa butter, milk fat, sunflower oil, safflower oil, olive oil, linseed oil, soybean oil, rapeseed oil, groundnut oil or mixtures, fractions or hydrogenates thereof. Preferably the fat is chosen so that the fat-based mix is solid at −18° C. in order to ensure that the shell is solid at normal storage temperatures for frozen confections. The fat-based mix may contain colours, flavours etc., for example it may be molten chocolate. The fat-based mix (and hence the shell) may be a water-in-oil emulsion which contains small emulsified droplets of an aqueous phase (i.e. 50 μm or less in diameter, preferably smaller than 10 μm). The fat-based mix may be aerated or unaerated. Preferably the mix is unaerated. Even when the fat-based mix is not a water-in-oil emulsion, it may nonetheless contain emulsifiers, preferably oil-soluble emulsifiers such as mono/di-glycerides, polyglcerol polyricinoleate (PGPR) or lecithin. These emulsifiers can help to encapsulate the aqueous core, especially when the phase volume of the core is relatively high.

Either or both of the aqueous and fat-based mixes may contain other ingredients, such as reactive ingredients. In one embodiment, one mix contains an ingredient which can react with another ingredient in the other mix, for example citric acid and sodium or potassium bicarbonate; or DHA (Docosahexaenoic acid, an omega 3 fatty acid found in fish oils which is sensitive to oxidation) and metal ions.

In a preferred embodiment, the fat-based mix and hence the fat-based shell is a chocolate or chocolate analogue, i.e. a chocolate-like material which is contains fats other than cocoa butter (for example coconut oil). Chocolate and chocolate analogues usually contain non-fat cocoa solids, but it is not essential that they do so (e.g. white chocolate). For example, a white chocolate analogue may consist essentially of vegetable oil and sugar, optionally together with colours and/or flavours.

The particles have an average particle size (i.e. mean diameter $D(1,0)$) of between 1 and 10 mm, preferably between 2 and 7 mm, more preferably between 4 and 6 mm. Preferably at least 80%, more preferably at least 90% of the particles have diameters within these size ranges. The particles are preferably substantially spherical. The size of the particles depends on a number of factors, including the viscosity and surface tension of the fat-continuous phase, the flow rate and the nozzle diameter.

The particles may have a single core, or alternatively they may have more than one core. When the particles have a single core, the core is typically from 1 to 4 mm, preferably from 1.5 to 3.5 mm in diameter (provided of course that the core is smaller than the whole particle). When the particles have more than one core, each core is generally smaller. Nonetheless, the cores are at least 0.1 mm, preferably at least 0.3 mm or 0.5 mm in diameter. Particles having more than one core can be produced by altering the flow rates of the aqueous and fat-based mixes. The viscosity of the mixes and the interfacial tension between them can also affect the formation of multiple cores.

FIG. 1 is a schematic diagram of the process for preparing the frozen coated particles.

The dispensing device 5 consists of two concentric nozzles, 3, 4. The fat-based mix 1 and the aqueous mix 2 are supplied to the outer nozzle 3 and inner nozzle 4 respectively. Typically the aqueous mix is supplied at ambient temperature, although this is not essential. The fat-based mix must also be liquid. Hence, depending on the type of fat, it may be at an elevated temperature in order to keep it molten and not too viscous. The particle 6 having a shell 7 and core 8 is formed as the mixes drip from the nozzles. The diameter of the nozzles is from 0.5 to 5 mm. The outer nozzle is typically 0.3 to 1 mm larger than the inner nozzle. Typically the inner nozzle has a diameter of 1 mm and the outer nozzle has a diameter of 1.5 mm. The particles drip from the nozzles into a bath of a refrigerant 9, preferably a cryogenic fluid such as liquid nitrogen, thereby solidifying the fat-based shell and freezing the aqueous core. The resulting particles are approximately spherical. The frozen particles are then retrieved, for example by using a sieve. A number of such nozzles can be used in parallel to increase the production rate of the particles.

The relative amounts of fat-based shell and aqueous core in the particles can be varied by changing the relative flow rates of the aqueous and fat-based mixes. The total flow rate is preferably not so high that a jet of the mixes is formed at the nozzle rather than a droplet. The formation of a jet results in particles which may be too small. Very low flow rates are preferably also avoided because of the length of time required to form the droplets. Preferably the core constitutes from 5 to 40 wt % of the particles, more preferably from 10 to 30 wt %, such as about 20 wt %.

The core-shell particles thus produced have many benefits and uses. For example, the core can be used to contain ingredients which are sensitive to oxidation, thereby protecting them from oxidation. Alternatively the core-shell structure can be used to keep ingredients separate which would otherwise react with each other, for example acid and bicarbonate. When the particles are consumed the core/shell structure breaks down, releasing the ingredients so that they can react with each other when desired, i.e. in the mouth. For example by using acid in the core and bicarbonate in the shell a fizzy sensation can be produced in the mouth. The fat-continuous shell can also be used to provide oil-soluble flavours. Moreover, the fat-based shell provides texture and flavour contrast with the frozen aqueous core, for example an orange flavoured water ice particle may be coated with a chocolate shell.

A further use of the core-shell particles is to mask unpleasant tasting substances. For example, caffeine and theobromine are known to affect the mood when ingested, and additionally have other beneficial effects like improved brain function, higher alertness, and appetite suppression. Therefore there is a desire to enrich food products with caffeine and theobromine, in order to achieve their beneficial effects. However, these compounds are bitter, which for many consumers is not favourable. By putting the caffeine/theobromine in the core while having a strongly flavoured shell, the bitter taste can be hidden or disguised. This principle can be used with any unpleasant tasting substance which can be placed in the aqueous core.

The core-shell particles may be consumed on their own, or alternatively they may be combined with other frozen particles or combined with (e.g. mixed into) frozen confections such as ice cream.

The present invention will now be further described with reference to the following example which is illustrative and not limiting.

Example 1: Particles with a Chocolate Shell and a Water Ice Core

A chocolate formulation for coating ice creams (22% cocoa mass, 24% cocoa butter, 5% butterfat, 9% whole milk powder, 39.5% sucrose, 0.4% emulsifier) was melted and placed in a heated, temperature-controlled syringe at 50° C. in order to keep it molten. A simple water ice mix was prepared by dissolving 5 wt % fructose and 0.75 wt % guar gum in hot water (80° C.) with stirring for 15 minutes. The mix was pasteurised and then cooled to 5° C. The mix was then placed in another syringe.

The two syringes were mounted onto syringe pumps. The outlet of each syringe was connected to the inlets of a concentric nozzle device. The syringe containing the aqueous mix was connected to the inlet for the inner nozzle, and the syringe containing the molten chocolate was connected to inlet for the outer nozzle. The diameters of the inner and outer nozzles were 1 mm and 1.5 mm respectively. The head of the nozzle device (containing the pipes leading to the nozzles) was also jacketed and held at 50° C. to ensure that the chocolate remained molten. The mixes were pumped to the nozzle by the syringe pumps. The chocolate was supplied at a flow rate of 1 g per minute and the water ice at 0.25 g per minute. Once the mixes reached the nozzle, core-shell droplets were formed at the nozzle outlet, which then dropped into a Dewar containing liquid nitrogen where they were rapidly frozen (i.e. within about 30 seconds) into approximately spherical particles having a diameter of about 5-6 mm. The core constituted 20 wt % of the particles. The Dewar was fitted with a sieve to allow easy retrieval of the particles once they had frozen. The frozen particles were stored in a freezer at −18° C.

The various features and embodiments of the present invention, referred to in individual sections above apply, as appropriate, to other sections, mutatis mutandis. Consequently features specified in one section may be combined with features specified in other sections, as appropriate.

The invention claimed is:

1. A process for preparing frozen particles having an average diameter of from 1 to 10 mm and comprising from 1 to 50 wt % of a frozen aqueous core and from 50 to 99 wt % of a fat-based shell, the process comprising:
   (a) providing a dispensing device having an inner nozzle and an outer nozzle which surrounds the inner nozzle;
   (b) supplying a fat-based mix to the outer nozzle and a liquid aqueous mix to the inner nozzle, thereby forming particles with a fat-continuous shell and a water-continuous liquid core, and then
   (c) dropping the particles into a refrigerant to form said frozen particles.

2. A process according to claim 1 wherein the aqueous mix is a water ice mix or an ice cream mix.

3. A process according to claim 1 wherein the fat-based mix comprises an oil selected from coconut oil, palm oil, palm kernel oil, cocoa butter, milk fat, sunflower oil, safflower oil, olive oil, linseed oil, soybean oil, rapeseed oil, groundnut oil and mixtures, fractions or hydrogenates thereof.

4. A process according to any of claim 1 wherein the core constitutes from 5 to 40 wt % of the particles.

5. A process according to claim 1 wherein the aqueous mix contains an ingredient which can react with an ingredient which is contained in the fat-based mix.

6. A process according to claim 1 wherein the particles have an average diameter of between 2 and 7 mm.

7. A process according to claim 1 wherein the fat-based mix is a chocolate or chocolate analogue.

8. A process according to claim 1 wherein the fat-based mix is a water-in-oil emulsion.

9. A process according to claim 1 wherein the particles each have a single core having a diameter of from 1 to 4 mm.

10. A process according to claim 1 wherein each particle has more than one core.

* * * * *